(12) United States Patent
Moad et al.

(10) Patent No.: US 8,110,626 B2
(45) Date of Patent: Feb. 7, 2012

(54) DISPERSING AGENTS IN COMPOSITES

(75) Inventors: Graeme Moad, Sassafras (AU); Guoxin Li, Mulgrave (AU); Jonathan Andrew Campbell, Maroubra (AU); Hendrik Wermter, Bensheim (DE); Rudolf Pfaendner, Rimbach (DE)

(73) Assignee: Advanced Polymerik PTY. Limited, Notting Hill, Victoria (AU)

( * ) Notice: Subject to any disclaimer, the term of this patent is extended or adjusted under 35 U.S.C. 154(b) by 268 days.

(21) Appl. No.: 11/992,176

(22) PCT Filed: Sep. 18, 2006

(86) PCT No.: PCT/EP2006/066436
§ 371 (c)(1),
(2), (4) Date: Dec. 2, 2009

(87) PCT Pub. No.: WO2007/039435
PCT Pub. Date: Apr. 12, 2007

(65) Prior Publication Data
US 2010/0069557 A1    Mar. 18, 2010

(30) Foreign Application Priority Data
Sep. 27, 2005   (EP) ..................... 05108914

(51) Int. Cl.
C08K 3/34   (2006.01)
C08K 5/10   (2006.01)

(52) U.S. Cl. ....................... 524/451; 524/315

(58) Field of Classification Search ............ 524/451
See application file for complete search history.

(56) References Cited

U.S. PATENT DOCUMENTS

| | | | |
|---|---|---|---|
| 3,627,723 A | 12/1971 | Kealy et al. | 260/41.5 |
| 4,199,491 A | 4/1980 | Inayoshi et al. | 260/31.2 |
| 4,399,246 A | 8/1983 | Hyde | 524/169 |
| 5,254,617 A * | 10/1993 | Inoue et al. | 524/433 |
| 5,567,759 A * | 10/1996 | Taniguchi et al. | 524/451 |
| 5,939,184 A | 8/1999 | Inoue et al. | 428/331 |
| 5,965,654 A | 10/1999 | Hirata et al. | 524/451 |
| 5,973,053 A | 10/1999 | Usuki et al. | 524/445 |
| 7,288,585 B2 * | 10/2007 | Moad et al. | 524/315 |
| 2004/0110881 A1 | 6/2004 | Panek et al. | |
| 2004/0235999 A1 | 11/2004 | Vathauer et al. | 524/436 |

FOREIGN PATENT DOCUMENTS

| | | |
|---|---|---|
| EP | 0454870 | 11/1991 |
| WO | 99/07790 | 2/1999 |
| WO | 00/34393 | 6/2000 |
| WO | 01/48080 | 7/2001 |
| WO | 01/85831 | 11/2001 |
| WO | 02/00776 | 1/2002 |
| WO | 2004/041721 | 5/2004 |
| WO | 2004/078785 | 9/2004 |
| WO | 2004/113436 | 12/2004 |

OTHER PUBLICATIONS

M. Kawasumi et al., Macromolecules, vol. 30, (1997), pp. 6333-6338.
B. Liao et al., Polymer, vol. 42, (2001), pp. 10007-10011.

* cited by examiner

*Primary Examiner* — Ling Choi
*Assistant Examiner* — Hui Chin
(74) *Attorney, Agent, or Firm* — Tyler A. Stevenson

(57) ABSTRACT

The present invention is directed to compositions comprising (a) a synthetic polymer, (b) a talc as a filler, wherein the talc particles have a mean particle size of from 0.4 to 25 μm, and are present in an amount of from 0.1 to 10% based on the weight of component (a) and (c) a dispersing agent which is based on a non-ionic surfactant or an amphiphilic statistical, block or comb copolymer, provided that when the synthetic polymer (a) is a polyamide, this is present in an amount of less than 55% based on the weight of (a), (b) and (c).

14 Claims, No Drawings

DISPERSING AGENTS IN COMPOSITES

The present invention relates to polymer composites, especially compositions comprising a synthetic polymer, a talc as a filler, wherein the talc particles have a mean particle size of from 0.4 to 25 μm, and a dispersing agent which is based on a non-ionic surfactant or a statistical, block or comb copolymer.

A further embodiment of the present invention is a process for the preparation of a polymer composite which comprises melt mixing a mixture of a synthetic polymer, the above talc filler and the above dispersing agent.

There exists substantial literature on organic-inorganic composites based on clays or layered silicates and synthetic polymers. Focus of the recent investigations is to reduce the amount of filler in such composites and to obtain materials with significant enhanced stiffness, heat distortion temperature, improved scratch resistance, etc. and simultaneously avoiding disadvantages in e.g. impact properties, elongation at break, long-term thermal stability etc. compared to the unfilled polymer. In this context polyolefin nanocomposites have been prepared from organic modified clays. The clays used are generally modified with long chain alkyl or dialkyl ammonium ions or amines or in a few cases other onium ions, like for example phosphonium. The ammonium ion/amine additives are usually incorporated into the clay structure by a separate intercalation step.

These organic modified clay based nanocomposites exhibit some of the above mentioned improvements, but have a number of disadvantages as well. The usually for modification used ammonium salts can be thermally unstable at temperatures used in polyolefin processing or can lead to undesired reactions under processing conditions. Furthermore, there exist still problems with respect to the stability of the composites, when the clays are directly dispersed into commercial polyolefins. There remain still doubts that the exfoliated structures formed in this way are stable and it is believed that these may reaggregate during subsequent melt processing operations like for example injection moulding.

Polyolefin nanocomposite formation by melt processing has thus required use of an additional additive, most often a polypropylene-graft-maleic anhydride, which in working examples is present as one of the major component of the final product.

A. Okada et al., Macromolecules 1997, 30, 6333-6338 or U.S. Pat. No. 5,973,053 discloses that a polypropylene nanocomposite is obtained when a clay, premodified with octadecylammonium salts, is compounded with polypropylene in the presence of polyolefin oligomers containing polar functionality, for example polypropylene-graft-maleic anhydride.

U.S. Pat. No. 5,939,184 discloses the formation of polypropylene nanocomposites based on alkyl ammonium modified clays and a polar graft polyolefin or an olefin copolymer which is typically used in excess of the amount of clay.

WO-A-99/07790 discloses a nanocomposite material on the basis of a clay having a layered structure and a cation exchange capacity of from 30 to 250 milliequivalents per 100 gram, a polymeric matrix and a block copolymer or a graft copolymer, which block copolymer or graft copolymer comprises one or more first structural units (A), which are compatible with the clay, and one or more second structural units (B), which are compatible with the polymeric matrix.

WO-A-00/34393 discloses a polymer-clay nanocomposite comprising (i) a melt-processible matrix polymer, (ii) a layered clay material, and (iii) a matrix polymer-compatible functionalized oligomer or polymer. A specifically disclosed example of component (iii) is for example an ammonium functionalized polycaprolactone.

WO-A-01/48080 discloses polyolefin nanocomposites based on the use of cation exchanged clay and a high molecular weight polypropylene graft maleic anhydride.

WO-A-01/85831 discloses polyolefin nanocomposites based on the use of cation exchanged clay and a polyolefin graft organic cation like for example an ammonium ion.

The use of a poly(ethylene oxide)-block-polyethylene in the preparation of a low density polyethylene nanocomposite is described by B. Liao et al. in Polymer 42, 10007-10011 (2001). These authors make no mention of the utility of the blocks in one step composite formation.

WO-A-02/00776 relates to a porous mold for use in a pressure casting process, which mold is manufactured of a polymeric material forming a matrix into which a clay and a block copolymer or a graft copolymer have been incorporated, wherein the block copolymer or graft copolymer comprises one or more first structural units (A), which are compatible with the clay, and one or more second structural units (B), which are compatible with the polymeric matrix for the manufacture of a porous filter material. A specifically disclosed example of such a block copolymer is a block copolymer consisting of one polyethylene oxide block (PEO) and one poly(methyl methacrylate) block (PMMA).

These known methods using organically (ammonium or amine) modified clays for the preparation of polyolefin nanocomposites do not in every respect satisfy the high requirements to be met, especially with regards to polyolefin mouldings which are subject to oxidative, thermal or light-induced degradation.

Further properties of interest include improved heat distortion temperature, improved fire retardancy, improved gas barrier, enhanced stiffness, improved visual appearance and dimensional stability without a significant loss in impact properties, elongation at break, long-term thermal stability, processing behavior etc.

Nanocomposites according to WO-A-04/113436, WO-A-04/078785 and WO-A-04/041721 circumvent some of the problems as e.g. problems in processing, long-term thermal stability, etc., but their effectiveness in terms of mechanical properties has further to be improved.

There is therefore still a need to find efficient polyolefin composites, as well as processes for the preparation thereof, that provide the properties of interest (significant enhanced stiffness, heat distortion temperature, improved scratch resistance, etc.) but do not have the disadvantages such as decreased e.g. impact properties, elongation at break, long-term thermal stability etc. compared to the unfilled polymer and which allows the use of a natural filler which has not been modified before use.

The present invention therefore relates to a composition comprising
(a) a synthetic polymer,
(b) a talc as a filler, wherein the talc particles have a mean particle size of from 0.4 to 25 μm and are present in an amount of from 0.1 to 10% based on the weight of component (a) and
(c) a dispersing agent which is based on a non-ionic surfactant or an amphiphilic statistical, block or comb copolymer;
provided that when the synthetic polymer (a) is a polyamide, this is present in an amount of less than 55% based on the weight of (a), (b) and (c).

Examples of Such Synthetic Polymers are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is gene-rated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, heterotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; poly(methyl methacrylate)s, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

Polyamides are present in an amount of less than 55% based on the weight of the components (a), (b) and (c) in the composition of the invention.

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and Polyester Carbonates.

20. Polyketones.

21. Polysulfones, Polyether Sulfones and Polyether Ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and Non-Drying Alkyd Resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The synthetic polymers as component (a) are preferably thermoplastic polymers, especially polyolefins, polystyrenes, polyamides, polyesters, polyacrylates, most preferably polyolefins, in particular polyethylene and polypropylene or copolymers thereof with mono- and diolefins.

Highly preferred are polyethylene or polypropylene or copolymers thereof, or mixtures thereof.

Talc as component (b) can be unmodified or modified by a modification agent such as, for example, an ammonium, an amine, a phosphonium, sulfonium or silane compound.

Examples of Modification Agents are:

1. Amine and ammonium compounds, for example, distearyldimethylammonium chloride, stearylbenzyldimethylammonium chloride, stearylamine, stearyldiethoxyamine or aminododecanoic acid [commercially available as Nanofil® from Südchemie, Germany]; dimethyl ditallow ammonium, trioctylmethyl ammonium, dipolyoxyethylenealkylmethyl ammonium or polyoxypropylenemethyldiethyl ammonium [commercially available as modified Somasif® from CO-OP Chemical]; octadecylamine, triethoxysilanyl-propylamine [commercially available as Nanomer® from Nanocor], polyalkoxylated ammonium compounds such as for example octadecyl bis(polyoxyethylene[15]amine [Ethomeen® from Eastman] or octadecyl methyl bis(polyoxyethylene[15]ammonium chloride [Etoquad® from Eastman] or just the corresponding free amines.

2. Phosphonium compounds, for example tetrabutylphosphonium or octadecyl triphenyl phosphonium [commercially available from Eastman].

3. Others, for example, triethoxyoctylsilane [commercially available as Nanomer® from Nanocor], ammonium, sulfonium or pyridium compounds as disclosed for example in WO-A-01/04050 or WO-A-99/67790; block or graft copolymers such as for example PEO-b-PS or poly-4-vinylpyridine-b-PS; or solvents for swelling such as for example γ-butyrolactone, 2-pyrrolidone, dimethylsulfoxide, diglyme, tetrahydrofuran or furfuryl alcohol.

It is preferred that the talc is unmodified. Furthermore, preference is given to natural talc.

The talc particles have preferably a mean particle size of from 0.4 to 10 μm, preferably 0.6 to 10 μm. Highly preferred is a mean particle size of 0.6 to 8 μm, especially 0.7 to 5 μm. Furthermore, it is preferred that at least 98% of the particles have a particle size of less than 50 μm, especially less than 30 μm and more preferably less than 20 μm.

Talc is preferably a mineral comprising at least 60% by weight and more preferably at least 80% by weight of true mineralogical talc, i.e. hydrous magnesium silicate having the theoretical molecular composition $3MgO.4SiO_2.H_2O$. (see also "Industrial Minerals and Rocks" published by The American Institute of Mining Metallurgy and Petroleum Engineers, New York 1960, pages 835-836).

Usually, talc is a natural and its elementary sheet is composed of a layer of magnesium-oxygen/hydroxyl octahedra, sandwiched between two layers of tetrahedral silica. The main surfaces, known as basal surfaces, of the elementary sheet in general contain neither hydroxyl groups nor active ions.

The nature of the mineralisation depends usually on the nature of the parent rock. Several types of rocks can undergo transformation of this type, and so be the source of talc. Talc deposits are classified according to the parent rock from which they derive. There are four types of talc deposits:

Deriving from magnesium carbonates: This kind of deposit provides >50% of world production. It is found in ancient metamorphosed carbonate sequences. This talc is generally pure and white.

Deriving from serpentines: This type of deposit provides about 40% of talc supplies. The crude ore is always grey and, to be commercially viable, can be up-graded to improve mineralogy and whiteness (generally by flotation).

Deriving from alumino-silicate rocks: About 10% of world production is mined from these deposits. They are sometimes found in combination with magnesium carbonate deposits. The crude ore is generally grey due to the presence of chlorite (another phyllosilicate), but no up-grading is generally necessary as chlorite performs adequately in the applications of interest.

Deriving from magnesium sedimentary deposits: Talc is formed by direct transformation of magnesium clays. No such deposit is currently mined.

As to the talc used as component (b) it is to be noted that the talc is not intercalated and/or exfoliated, which is in clear contradistinction to the so-called nano-scaled fillers which have a medium particle size of less than 200 nm. According to the present invention the dispersing agent (c) solely has the function to disperse the talc filler in the polymer matrix.

Talc as the component (b) is present in the composition in an amount of from 0.1 to 10% based on the weight of component (a). A highly preferred range for the amount of component (b) in the composition is 1 to 10%, especially 2.5 to 7.5%, based on the weight of component (a).

Compositions which are of interest include those comprising a dispersing agent (c) having at least one talc compatible segment (and at least one further segment which is compatible with the synthetic polymer (a) and which in the case where the matrix polymer is a polyolefin will typically be a hydrophobic segment).

Preferably, the dispersing agent (c) comprises a talc compatible segment which comprises groups such as for example ether [—O—],

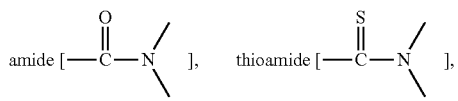

nitrile, anhydride, hydroxy, amine, pyridine, ammonium and phosphonium in appropriate proximity. The talc compatible segment may also be based on reactive monomers containing groups such as anhydride, epoxy or silane.

As examples of monomers comprising such segments which are compatible with the talc the following are named: PEO acrylate, 1-vinyl-2-pyrrolidinone, N,N-dimethyl acrylamide, acrylonitrile, maleic anhydride, hydroxyethyl acrylate, hydroxypropyl acrylate, tert-butyl α-hydroxymethacrylate, N,N'-dimethylaminoethyl acrylate, 4-vinylbenzyldihydroxyethylamine, 4-vinylpyridine or 4-vinylbenzyltributylphosphonium chloride, and, as block grafts, poly(ethylene oxide), poly(vinyl pyrrolidone), polyacrylamide, polyacrylonitrile or poly(vinyl alcohol).

The segment which is compatible with the synthetic polymer (a) is preferably characterized by being miscible or compatible with the polyolefin matrix phase such as a hydrocarbon segment, like a branched or unbranched polyolefin or a long chain alkyl(meth)acrylate. Alternatively, the "hydrophobic" segment is incompatible with the polyolefin and comprises a non-aggregating material such as a fluorocarbon, a siloxane segment or a low molecular weight methacrylate.

The dispersing agent (c) as a non-ionic surfactant is preferably a linear non-ionic surfactant.

Of special interest as non-ionic surfactants for dispersing agent (c) are those which are copolymers containing hydrophilic and hydrophobic segment(s) which do not contain an onium functionality, and the hydrophilic segment is a poly(ethylene oxide) block and the hydrophobic segment is a branched or unbranched polyolefin, a fluorocarbon, a siloxane or a low molecular weight methacrylate.

Also of interest as non-ionic surfactants for dispersing agent (c) are copolymers containing hydrophilic and hydrophobic segment(s) which do not contain an onium functionality, and the hydrophilic segment is a poly(ethylene oxide) block and the hydrophobic segment is a branched or unbranched polyolefin.

Likewise of special interest as non-ionic surfactants for dispersing agent (c) is a sorbitan ester, a dimethylsiloxane-ethylene oxide-block copolymer, a poly(methyl methacrylate)-block-poly(oxyethylene) copolymer or a compound of the formula (1)

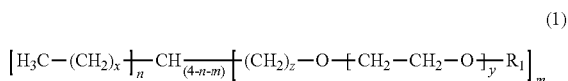

wherein m is 1 or 2, n is 1 or 2, x is greater than or equal to 1, y is greater than or equal to 1, z is greater than or equal to 0, and $R_1$ is hydrogen or $C_1$-$C_{25}$alkyl.

The compounds of the formula (1) are symmetrical or asymmetrical. This means that, if n is 2, "x" may be identical or different to the "x" in the other residue.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl or octadecyl.

Preferred compounds of the formula (1) are linear polyethylene-block-poly(ethylene oxides) of the formula I, wherein m is 1, n is 1, x is 8 to 50, y is 1 to 32, z is 0, and $R_1$ is hydrogen.

Many of these preferred linear polyethylene-block-poly(ethylene oxides) are commercially available like for example Aldrich polyethylene-block-poly(ethylene oxide) MW 1400 (average x is 50; average y is 15); Aldrich polyethylene-block-polyethylene oxide) MW 875 (average x is 50; average y is 4); Aldrich polyethylene-block-poly(ethylene oxide) MW 920 (average x is 32; average y is 10); Aldrich polyethylene-block-poly(ethylene oxide) MW 575 (average x is 33; average y is 2-3); Nafol 1822+2EO (average x is 20; average y is 2).

Especially preferred compounds of the formula (1) are polyethylene-block-polyethylene oxides) of the formula (1) such as for example the compounds of the formula Ia, Ib, Ic, Id or Ie which are accessible according to known literature methods, referenced as DAB25, DAB50, Aduxol GA7-02, Aduxol GA8-03 and Aduxol GA10-03.

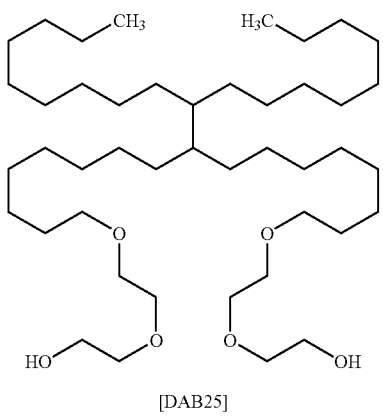

[DAB25]

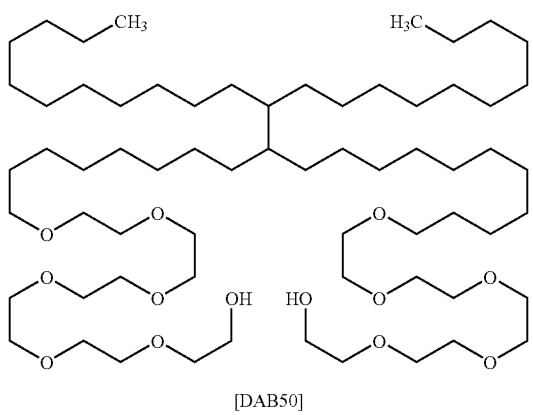

[DAB50]

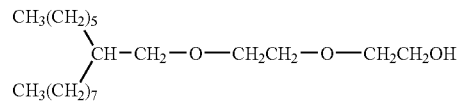

[Aduxol GA7-02]

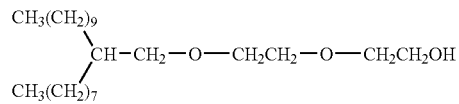

[Aduxol GA8-03]

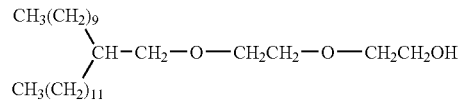

[Aduxol GA10-03]

Preferred sorbitan esters are esters of sorbitol or an ethoxylated sorbitan with a $C_{12}$-$C_{25}$carboxylic acid.

Examples of $C_{12}$-$C_{25}$carboxylic acids are lauric acid, oleic acid, palmitic acid or stearic acid. Esters of these carboxylic acids with sorbitol are commercially available from Fluka (Switzerland) as Span 20® [sorbitan monolaurate], Span 40® [sorbitan monopalmitate], Span 60® [sorbitan monostearate], Span 65® [sorbitan tristearate], Span 80® [sorbitan monooleate] or Span 85® [sorbitan trioleate].

A preferred ester of an ethoxylated sorbitan with a $C_{12}$-$C_{25}$carboxylic acid is for example the compound of the formula (2)

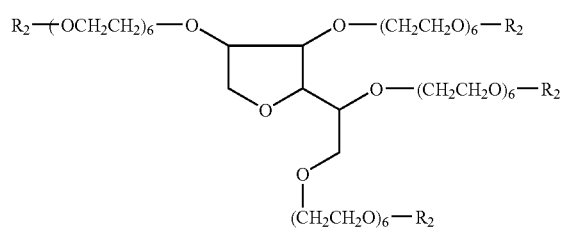

wherein $R_2$ is $C_{12}$-$C_{25}$alkanoyl or $C_{12}$-$C_{25}$alkenoyl.

Alkanoyl having 12 to 25 carbon atoms is a branched or unbranched radical, for example, dodecanoyl, tridecanoyl, tetradecanoyl, pentadecanoyl, hexadecanoyl, heptadecanoyl, octadecanoyl, icosanoyl or docosanoyl. Preference is given to alkanoyl having from 14 to 18 carbon atoms. Special preference is given to octadecanoyl (stearoyl).

Alkenoyl having 12 to 25 carbon atoms is a branched or unbranched radical comprising one or more carbon-carbon double bonds, for example, dodecenoyl, tridecenoyl, tetradecenoyl, pentadecenoyl, hexadecenoyl, heptadecenoyl or octadecenoyl. Preference is given to alkenoyl having from 14 to 18 carbon atoms. Special preference is given to octadecenyl (oleyl).

Fluorocarbons of special interest are for example semifluorinated surfactants like for example Du Pont Zonyl® fluorosurfactans. Examples of such compounds are Zonyl FSA® [$R_F$CH$_2$CH$_2$SCH$_2$CH$_2$CO$_2$Li]; Zonyl FSN® [$R_F$CH$_2$CH$_2$O (CH$_2$CH$_2$)$_x$H]; or Zonyl TBS® [$R_F$CH$_2$CH$_2$SO$_3$Y], wherein $R_F$ is F(CF$_2$CF$_2$)$_{3-8}$, and Y is hydrogen.

Siloxanes of special interest are for example polysiloxanes like for example those disclosed in Table A.

TABLE A

Examples of polysiloxanes

| Code | Structure |
|---|---|
| DBE-224 | PDMS-PEO block (75/25) |
| DBE-712 | PDMS-PEO block (25/75) |
| DBE-814 | PDMS-PEO block (20/80) |
| DBE-821 | PDMS-PEO block (15/85) |
| DBP-732 | PDMS-(PPO/60-PEO/40) block (30/70) |
| DMS-E12 | EPCH$_2$O(CH$_2$)$_3$-PDMS-(CH$_2$)$_3$OCH$_2$EP (EPOXYPROPOXYPROPYL TERMINATED POLYDIMETHYLSILOXANE) |
| DMS-E21 | EPCH$_2$O(CH$_2$)$_3$-PDMS-(CH$_2$)$_3$OCH$_2$EP |
| DMS-A12 | H$_2$N(CH$_2$)$_3$-PDMS-(CH$_2$)$_3$NH$_2$ |
| DMS-A21 | H$_2$N(CH$_2$)$_3$-PDMS-(CH$_2$)$_3$NH$_2$ |

PDMS is polydimethylsiloxane.
PEO is polyethylene oxide.
EPCH$_2$O is epoxypropoxy.
PPO is polypropylene oxide.

The amphiphilic statistical, block or comb copolymers used as dispersing agent (c) can also be described as polymeric dispersing or solvating agents having amphiphilic properties. They usually have polar and nonpolar groups in the same molecule and they are, for example, dispersing or solvating agents based on polyethylene glycols (PEG), polyacrylates, polysiloxanes, polyvinyl acetate or on block copolymers containing at least one block copolymer based on acrylate, acrylic acid or methacrylate. In particular, the amphiphilic statistical, block or comb copolymers refer to such as contain groups of both hydrophilic and hydrophobic nature. These copolymers contain groups that have affinity for the talc and groups having affinity for the matrix polymer.

Preferred as amphiphilic statistical, block or comb copolymers for dispersing agent (c) are corresponding acrylic copolymers.

The molecular weight of the copolymers, especially the acrylic copolymers, is preferably between 1000 and 100000 and the polydispersity between 1.05 and 3.0. More preferably the molecular weight is between 2000 and 20000 and the polydispersity is between 1.05 and 2.0.

Block copolymers are, for example, diblock copolymers (A-B type) or triblock copolymers (A-B-A or A-B-C type) and so-called tapered structures.

Amphiphilic diblock copolymers (A-B type) are, for example, poly(styrene)-block-poly(methyl methacrylate), poly(styrene)-block-poly(tert-butylmethacrylate), poly(styrene)-block-poly(methyl acrylate), poly(styrene)-block-poly (n-butyl acrylate), poly(styrene)-block-poly(tert-butyl acrylate), poly(styrene)-block-poly(2-vinylpyridine), poly (styrene)-block-poly(4-vinyl-pyri-dine), poly(styrene-bis-tert-butylstyrene), poly(styrene)-block-poly (dimethylsiloxane), poly(butadiene)-block-poly (dimethylsiloxane), poly(butadiene[1,4-addition])-block-poly(methyl methacrylate), poly(isoprene[1-4-addition])-block-poly(methyl methacrylate), poly(butadiene)-block-poly(tert-butylmethacrylate), poly(butadiene)-block-poly (tert-butyl acrylate), poly(isoprene)-block-poly(2-vinylpyridine), poly(butadiene)-block-poly(4-vinylpyridine), poly-(styrene)-block-poly(methyl methacrylate), poly(methyl methacrylate)-block-poly(tert-butyl methacrylate), poly(methyl methacrylate)-block-poly (tert-butyl acrylate), poly(tert-butyl acrylate)-block-poly (methyl methacrylate), poly(n-butyl acrylate)-block-poly (methyl methacrylate), poly(2-vinylpyridine)-block-poly (methyl methacrylate), poly(tert-butyl methacrylate)-block-poly(tert-butyl acrylate), poly(tert-butyl methacrylate)-block-poly(2-vinylpyridine), poly(tert-butyl methacrylate)-block-poly(4-vinylpyridine), poly(tert-butyl acrylate)-block-poly(2-vinylpyridine), poly(2-vinylpyridine)-block-poly(4-vinylpyridine), poly(ethylene)-block-poly(methyl methacrylate), poly(ethylene)-block-poly(2-vinylpyridine) or poly(ethylene)-block-poly(4-vinylpyridine).

Non-amphiphilic diblock copolymers (A-B type) are, for example, poly(styrene)-block-poly(butadiene), poly(styrene)-block-poly(isoprene[1,4-addition]), tapered block copolymer poly(styrene)-block-poly(butadiene), tapered block copolymer poly(styrene)-block-poly(ethylene).

Amphiphilic triblock copolymers of the A-B-A type are, for example, poly(methyl methacrylate)-block-poly(styrene)-block-poly(methyl methacrylate), poly(tert-butyl methacrylate)-block-poly(styrene)-block-poly(tert-butyl methacrylate), poly(tert-butyl acrylate)-block-poly(styrene)-block-poly(tert-butyl acrylate), poly(2-vinylpyridine)-block-poly(styrene)-block-poly(tert-butyl acrylate), poly(4-vinylpyridine)-block-poly(styrene)-block-poly(4-vinylpyridine), poly(methyl methacrylate)-block-poly (butadiene[1,4- or 1,2-addition])-block-poly(methyl methacrylate), poly(tert-butyl methacrylate)-block-poly(methyl methacrylate)-block-poly(tert-butyl methacrylate), poly (tert-butyl acrylate)-block-poly(methyl methacrylate)-block-poly(tert-butyl acrylate), poly(methyl methacrylate)-block-poly(2-vinylpyridine)-block-poly(methyl methacrylate), poly(4-vinylpyridine)-block-poly(methyl methacrylate)-block-poly(4-vinylpyridine), poly(methyl methacrylate)-block-poly(tert-butyl acrylate)-block-poly(methyl methacrylate), poly(methyl methacrylate)-block-poly(n-butyl acrylate)-block-poly(methyl methacrylate), poly(tert-butyl methacrylate)-block-poly(tert-butyl acrylate)-block-poly (tert-butyl methacrylate), poly(2-vinylpyridine)-block-poly (tert-butyl acrylate)-block-poly(2-vinylpyridine), poly(4-vinylpyridine)-block-poly(tert-butyl acrylate)-block-poly(4-vinylpyridine), poly(styrene)-block-poly(n-butyl acrylate)-block-poly(styrene), poly(styrene)-block-poly(ethyl acrylate)-block-poly(styrene), poly(styrene)-block-poly(ethylene)-block-poly(styrene), poly(styrene)-block-poly(butylene)-block-poly(styrene), poly(ethylene oxide)-block-poly (styrene)-block-poly(ethylene oxide), poly(styrene)-block-poly(ethylene oxide)-block-poly(styrene) or poly(styrene)-block-poly(acrylic acid)-block-poly(styrene).

Non-amphiphilic triblock copolymers of the A-B-A type are, for example, poly(butadiene[1,2-addition])-block-poly (styrene)-block-poly(butadiene[1,2-addition]), poly(butadiene[1,4-addition])-block-poly(styrene)-block-poly(butadiene[1,4-addition]), poly(styrene)-block-poly(butadiene[1,4- and 1,2-addition])-block-poly(styrene).

Amphiphilic triblock copolymers of the A-B-C type are, for example, poly(styrene)-block-poly(butadiene)-block-poly(2-vinyl-pyridine), poly(styrene)-block-poly(butadiene)-block-poly(4-vinylpyridine), poly(styrene)-block-poly(tert-butyl methacrylate)-block-poly(2-vinylpyridine), poly(styrene)-block-poly(tert-butylmethacrylate)-block-poly(4-vinylpyridine), poly(styrene)-block-poly(2-vinylpyridine)-block-poly(4-vinylpyridine), poly(butadiene)-block-poly(styrene)-block-poly(methyl methacrylate), poly(styrene)-block-poly(butadiene)-block-poly(methyl methacrylate), poly(styrene)-block-poly(2-vinylpyridine)-block-poly(ethyl oxide), poly(styrene)-block-poly(tert-butyl acrylate)-block-poly(methyl methacrylate), poly(styrene)-block-poly(acrylic acid)-block-poly(methyl methacrylate), poly(styrene)-block-poly(a-methylstyrene)-block-poly(methyl methacrylate) or poly(styrene)-block-poly(a-methylstyrene)-block-poly(tert-butyl acrylate).

Particularly suitable dispersing or solvating agents having amphiphilic properties are, for example, poly(butadiene)-block-poly(methyl methacrylate), poly(isoprene)-block-poly(methyl methacrylate), poly(ethylene)-block-poly(methyl methacrylate), poly(styrene)-block-poly(4-vinylpyridine), poly(styrene-2)-block-poly(vinylpyridine), poly(styrene)-block-poly(n-butyl acrylate), poly(styrene)-block-poly(tert-butyl acrylate), poly(styrene)-block-poly(sodium acrylate), poly(styrene)-block-poly(acrylic acid), poly(methyl methacrylate)-block-poly(sodium acrylate), poly(methyl methacrylate)-block-poly(sodium methacrylate), poly(ethylene oxide)-block-poly(ε-caprolactone), poly(2-vinylpyridine)-block-poly(ethylene oxide), poly(butadiene)-block-poly(ethylene oxide), poly(butadiene)-block-poly(sodium acrylate), poly(ethylene)-block-poly(ethylene oxide), poly(ethylene)-block-poly(propylene oxide), poly(styrene)-block-poly(ethylacrylate)-block-poly(styrene), poly(ethylene oxide)-block-poly(styrene)-block-poly(ethylene oxide), poly(styrene)-block-poly(acrylic acid-styrene), poly(styrene)-block-poly(butadiene)-block-poly(methyl methacrylate), poly(styrene)-block-poly(vinylpyridine)-block-poly(ethylene oxide), poly(styrene)-block-poly(4-vinylbenzoic acid), poly(styrene)-block-poly(polyglycidyl methacrylate), poly(ethylene)-block-poly(glycidyl methacrylate), poly(propylene)-block-poly(acrylic acid), poly(ethylene)-block-poly(acrylic acid), poly(propylene)-block-poly(maleic anhydride), poly(ethylene)-block-poly(maleic anhydride), poly(styrene)-block-poly(maleic anhydride), poly(methacrylic acid)-poly(alkylene oxide) block copolymers, for example according to EP-A-0 859 028, polysiloxane-polyoxyalkylene, copolymers of maleates and styrene or styrene derivatives, for example according to EP-A-0 791 024, polystyrene-polysiloxane block copolymers, polyacrylate-polysiloxane block copolymers and cyclosiloxane-radiale copolymers, prepared e.g. using ATRP technology according to EP-A-0 870 774, methyl acrylate-styrene copolymer, methyl methacrylate-styrene, polybutadiene-methyl acrylates, prepared by nitroxyl-initiated radical polymerisation according to EP-A-0 135 280.

Suitable amphiphilic block copolymers are, for example, polyacrylate/polystyrene, polymethacrylate/polyethylene oxide, polyacrylate/polyethylene oxide, polyacrylate/polyethylene, polyvinyl acetate/polyethylene, polyacrylate/polybutadiene, polyacrylate/polyisoprene, polyisoprene/polymethyl methacrylate, polyethylene/polymethyl methacrylate, polyethylene/polyethylene oxide or polyethylene/polypropylene oxide. Non-amphiphilic block copolymers are e.g. polystyrene/polybutadiene and polyalkylene oxides, such as polyethylene oxide, polypropylene oxide and polybutylene oxide.

Particularly suitable dispersing or solvating agents having amphiphilic properties are, for example, poly(styrene)-block-poly(sodium acrylate), poly(styrene)-block-poly(acrylic acid), poly(styrene)-block-poly(sodium methacrylate), poly(styrene)-block-poly(N-methyl-4-vinylpyridinium iodide), poly(isoprene)-block-poly(N-methyl-2-vinylpyridinium iodide), poly(styrene)-block-poly(ethylene oxide), poly(methyl methacrylate)-block-poly(sodium acrylate), poly(methyl methacrylate)-block-poly(sodium methacrylate), poly(methyl methacrylate)-block-poly(ethylene oxide), poly(tert-butylmethacrylate)-block-poly(ethylene oxide), poly(methyl methacrylate)-block-poly(N-methyl-4-vinylpyridinium iodide), poly(ethylene oxide)-block-poly(lactide), poly(2-vinylpyridine)-block-poly(ethylene oxide), poly(butadiene)-block-poly(sodium acrylate), poly(butadiene)-block-poly(sodium methacrylate), poly(butadiene)-block-poly(N-methyl-4-vinylpyridinium iodide), poly(butadiene)-block-poly(ethylene oxide), poly(ethylene)-block-poly(ethylene oxide) or poly(ethylene)-block-poly(propylene oxide).

It should be noted that poly(octadecyl acrylate) homopolymer can be considered amphiphilic even though all monomer units are the same since it contains ester linkages and hydrocarbon chains.

Other likewise preferred dispersing or solvating agents based on polyacrylates are described, inter alia, in U.S. Pat. No. 5,133,898.

A highly preferred class of amphiphilic statistical, block or comb copolymer for dispersing agent (c) are those having at least one segment which is based on a long chain alkyl (meth) acrylate. The long chain alkyl(meth)acrylate hereby constitutes the segment which is compatible with the synthetic polymer (a). For the segment which is compatible with the talc (b) the definitions and preferences given above apply.

Of special interest as amphiphilic statistical, block or comb copolymer for dispersing agent (c) are those having at least 10-100% (mol %) segments based on a long chain alkyl (meth)acrylate.

Preferred as amphiphilic statistical, block or comb copolymer for dispersing agent (c) are those comprising an acrylate or methacrylate comprising at least 8 methylene groups in the side chain. Also of interest are copolymers comprising a $C_{12}$-$C_{32}$alkyl(meth)acrylate), for example stearyl or octadecyl acrylate (ODA) or octadecyl methacrylate (ODMA).

Alkyl having between 8 and 32 carbon atoms is a branched or unbranched radical, for example octyl, decyl, 1-methylundecyl, dodecyl, tridecyl, tetradecyl, pentadecyl, hexadecyl, heptadecyl or octadecyl.

Surprisingly, we have found that homopolymers based on long chain (meth)acrylates and their copolymers with short chain (meth)acrylates are effective as well.

An example of a preferred homopolymer is poly(octadecyl acrylate). An example of a preferred copolymer is poly((octadecyl methacrylate)-co-(methyl acrylate)).

Of special interest as amphiphilic statistical, block or comb copolymer for dispersing agent (c) are (octadecyl acrylate)-co-(maleic anhydride), poly(octadecyl acrylate)-co-(poly(ethylene glycol) methyl ether acrylate), poly(octadecyl acrylate)-co-(diethylene glycol ethyl ether acrylate), poly(octadecyl acrylate)-co-(N-vinylpyrrolidone), poly(octadecyl methacrylate)-co-(N-vinylpyrrolidone), poly(octadecyl methacrylate)-co-(maleic anhydride), poly(octadecyl acrylate)-co-(glycidyl acrylate), poly(octadecyl acrylate)-co-(2-dimethylaminoethyl acrylate), poly(octadecyl acrylate)-co-(poly(ethylene glycol) methyl ether acrylate), poly(octadecyl acrylate)-co-(diethylene glycol ethyl ether acrylate), poly(octadecyl acrylate)-co-(methacryloloxyethyl phosphate), poly(lauryl acrylate)-co-(maleic anhydride), poly(octadecyl acrylate)-co-(glycidyl methacrylate) or poly(octadecyl acrylate)-co-(methacrylic acid), Most preferred as amphiphilic statistical, block or comb copolymer for dispersing agent (c) are corresponding copolymers of long chain alkyl(meth)acrylates, especially ODA, with maleic anhydride, dimethylaminoethyl acrylate, or PEO acrylate.

Surprisingly the copolymers given above for dispersing agent (c) are little affected whether the polar segments are introduced as single units (in a statistical copolymer) or as a sequence (in a block copolymer). Polymers prepared by controlled radical polymerization appear slightly more effective than those prepared by conventional polymerization. This may be due to the greater structural regularity (compositional homogeneity and narrower polydispersity) of these copolymers.

Preference is given to copolymers as dispersing agent (c) which are prepared by controlled or living free radical polymerization. Polymers prepared by controlled or living free radical polymerization are more uniform in composition. It can be ensured that in copolymerization all chains contain the hydrophilic or reactive functionality. Polymers prepared by controlled or living free radical polymerization are more uniform in molecular weight distribution. Preferred are block or comb copolymers, especially block copolymers.

The dispersing agent used as component (c) is preferably present in the composition in an amount of from 0.01 to 10%, preferably 0.01 to 5%, based on the weight of component (a). A highly preferred range for the amount of component (c) in the composition is 0.05 to 5%, based on the weight of component (a).

The non-ionic surfactants and amphiphilic statistical block or comb copolymers for the dispersing agent (c) can be prepared according to the methods described in detail in WO-A-04/041721, WO-A-04/078785 and WO-A-04/113436.

The methods for the preparation of the dispersing agents (c) include conventional free radical polymerization and controlled free radical polymerization (CFRP). Such controlled free radical polymerization (CFRP) can preferably occur by four suitable routes:

a1) Polymerization in the presence of alkoxyamine initiator/regulator compounds;
a2) Polymerization in the presence of a stable nitroxyl free radical and a radical initiator (source of free radicals);
a3) Polymerization under atom transfer radical polymerization (ATRP); or
a4) RAFT polymerization which refers to a method of polymer synthesis by radical polymerization using chain transfer agents which react by reversible addition-fragmentation chain transfer.

For example U.S. Pat. No. 4,581,429 or EP-A-0 621 878 discloses the preparation of block copolymers by method a1).

For example WO-A-94/11412 discloses the preparation of block copolymers by method a2).

For example WO-A-01/51534 discloses the preparation of comb copolymers by the ATRP method a3). Kamigaito and Sawamoto in Chemical Reviews 2001, 101, 3689-3745 describe the preparation of block and other polymers by the ATRP method a3) as well.

For example WO-A-98/01478, WO-A-99/05099 or WO-A-99/31144 disclose the preparation of block copolymers by method a4).

The abovementioned patents are incorporated herein by reference.

Examples of the application of Conv (conventional radical polymerization), of the application of NMP [nitroxide mediated polymerization, method a2) to prepare polymers suitable for use in the present invention], of the application of RAFT (polymerization with reversible addition fragmentation chain transfer, method a4) for random copolymers or block copolymers, and of the application of Macroinit (conventional polymerization with a macroinitiator) are described in the exemplification of WO-A-04/113436.

The synthesis of copolymers polymerization can be carried out in emulsion, solution or suspension in either a batch, semi-batch, continuous, or feed mode. In the case of living or controlled radical polymerization block and multi-block and gradient copolymers may be prepared by varying the rate of monomer(s) addition and/or by varying the sequence in which the monomer(s) are added to the polymerization medium. Gradient copolymers may also be prepared in a one-step process by making use of the inherent difference in reactivity of the monomer(s). For gradient block copolymers, it is often desirable to pick comonomers with disparate reactivity ratios. For example, maleic anhydride with styrene or (meth)acrylates.

In addition to components (a), (b) and (c) the novel compositions may comprise further additives, such as, for example, the following:

1. Antioxidants
   1.1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side-chain, e.g. 2,6-dinonyl-4-methylphenol, 2,4-dimethyl-6-(1'-methylundec-1'-yl)-phenol, 2,4-dimethyl-6-(1'-methylheptadec-1'-yl)-phenol, 2,4-dimethyl-6-(1-methyltridec-1'-yl)-phenol and mixtures thereof.
   1.2. Alkylthiomethylphenols, for example 2,4-dioctylthiomethyl-6-tert-butylphenol, 2,4-dioctyl-thiomethyl-6-methylphenol, 2,4-dioctylthiomethyl-6-ethylphenol, 2,6-didodecylthiomethyl-4-nonylphenol.
   1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octa-decyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis (3,5-di-tert-butyl-4-hydroxyphenyl)adipate.
   1.4. Tocopherols, for example α-tocopherol, β-tocopherol, γ-tocopherol, δ-tocopherol and mixtures thereof (Vitamin E).
   1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulfide.
   1.6. Alkylidene bisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butyl-phenol), 2,2'-ethylidenebis(6-tert-butyl-4-isobutylphenol), 2,2'-methylenebis

[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzyl mercaptoacetate, tridecyl-4-hydroxy-3,5-di-tert-butylbenzyl mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxy-benzyl)sulfide, isooctyl-3,5-di-tert-butyl-4-hydroxybenzyl mercaptoacetate.

1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di-[4-(1,1,3,3-tetramethylbutyl)phenyl]2,2-bis(3,5-di-tert-butyl-4-hydroxybenzyl)malonate.

1.9. Hydroxybenzyl aromatic compounds, for example 1,3,5-tris(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bisoctylmercapto-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl)isocyanurate.

1.11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, calcium salt of 3,5-di-tert-butyl-4-hydroxybenzyl-phosphonic acid monoethyl ester.

1.12. Acylaminophenols, for example 4-hydroxylauric acid anilide, 4-hydroxystearic acid anilide, N-(3,5-di-tert-butyl-4-hydroxyphenyl)carbamic acid octyl ester.

1.13. Esters of β-(3,5-di-tert-butyl-4-hydroxyphenyl)propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenyl-propionyl)hydrazide), N,N'-bis[2-(3-[3,5-di-tert-butyl-4-hydroxyphenyl]-propionyloxy)ethyl]-oxamide (Naugard®XL-1 from Uniroyal).

1.18. Ascorbic acid (Vitamin C).

1.19. Amine-type antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethyl-butyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di[(2-methyl-phenyl)amino]ethane, 1,2-di(phenylamino)propane, (o-tolyl)-biguanide, di[4-(1',3'-dimethyl-butyl)phenyl]amine, tert-octylated N-phenyl-1-naphthylamine, mixture of mono- and dialkylated tert-butyl-/ tert-octyl-diphenylamines, mixture of mono- and di-alkylated nonyldiphenylamines, mixture of mono- and di-alkylated dodecyldiphenylamines, mixture of mono- and di-alkylated isopropyl-/isohexyl-diphenylamines, mixtures of mono- and di-alkylated tert-butyldiphenylamines, 2,3-dihydro-3,3-dimethyl-4H-1,4-benzothiazine, phenothiazine, mixture of mono- and di-alkylated tert-butyl-/tert-octyl-phenothiazines, mixture of mono- and dialkylated tert-octylphenothiazines, N-allylphenothiazine or N,N,N',N'-tetraphenyl-1,4-diaminobut-2-ene.

2. UV Absorbers and Light Stabilizers 2.1. 2-(2'-Hydroxyphenyl)-benzotriazoles, for example 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis($\alpha,\alpha$-dimethylbenzyl)-2'-hydroxyphenyl)-benzotriazole, 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyl-oxy)carbonylethyl]-2'-hydroxyphenyl)-benzotriazole, 2-(3'-dodecyl-2'-hydroxy-5'-methyl-phenyl)-benzotriazole, 2-(3'-tert-butyl-2'-hydroxy-5'-(2-isooctyloxycarbonylethyl)-phenyl-benzotriazole, 2,2'-methylenebis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300; [R—CH$_2$CH$_2$—COO—CH$_2$CH$_2$—]$_2$ wherein R=3'-tert-butyl-4'-hydroxy-5'-2H-benzotriazol-2-yl-phenyl; 2-[2'-hydroxy-3'-($\alpha,\alpha$-dimethylbenzyl)-5'-(1,1,3,3-tetramethylbutyl)-phenyl]-benzotriazole; 2-[2'-hydroxy-3'-(1,1,3,3-tetramethylbutyl)-5'-($\alpha,\alpha$-dimethylbenzyl)-phenyl]-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4. Acrylates, for example $\alpha$-cyano-$\beta,\beta$-diphenylacrylic acid ethyl ester or isooctyl ester, $\alpha$-methoxycarbonylcinnamic acid methyl ester, $\alpha$-cyano-$\beta$-methyl-p-methoxycinnamic acid methyl ester or butyl ester, $\alpha$-methoxycarbonyl-p-methoxycinnamic acid methyl ester, N-($\beta$-methoxycarbonyl-$\beta$-cyanovinyl)-2-methyl-indoline.

2.5. Nickel compounds, for example nickel complexes of 2,2'-thio-bis[4-(1,1,3,3-tetra-methylbutyl)phenol], such as the 1:1 or 1:2 complex, optionally with additional ligands, such as n-butylamine, triethanolamine or N-cyclohexyldiethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

2.6. Sterically hindered amines, for example bis(2,2,6,6-tetramethylpiperid-4-yl) sebacate, bis(2,2,6,6-tetramethylpiperid-4-yl) succinate, bis(1,2,2,6,6-pentamethylpiperid-4-yl) sebacate, bis(1-octyloxy-2,2,6,6-tetramethylpiperid-4-yl) sebacate, n-butyl-3,5-di-tert-butyl-4-hydroxybenzylmalonic acid bis(1,2,2,6,6-pentamethylpiperidyl) ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl)nitrilotriacetate, tetrakis(2,2,6,6-tetramethyl-4-piperidyl)-1,2,3,4-butanetetraoate, 1,1'-(1,2-ethane-diyl)bis(3,3,5,5-tetramethylpiperazinone), 4-benzoyl-2,2,6,6-tetramethylpiperidine, 4-stearyl-oxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetra-methylpiperidyl)succinate, linear or cyclic condensation products of N,N'-bis(2,2,6,6-tetra-methyl-4-piperidyl)hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)-ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'-bis(2,2,6,6-tetramethyl-4-piperidyl) hexamethylenediamine and 4-cyclohexylamino-2,6-dichloro-1,3,5-triazine, condensation product of 1,2-bis(3-aminopropylamino)ethane and 2,4,6-trichloro-1,3,5-triazine and 4-butyl-amino-2,2,6,6-tetramethylpiperidine (CAS Reg. No. [136504-96-6]); condensation product of 1,6-diaminohexane and 2,4,6-trichloro-1,3,5-triazine and also N,N-dibutylamine and 4-butyl-amino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylenemalonic acid with 1,2,2,6,6-pentamethyl-4-hydroxypiperidine, poly[methyl-propyl-3-oxy-4-(2,2,6,6-tetramethyl-4-piperidyl)]siloxane, reaction product of maleic anhydride $\alpha$-olefin copolymer and 2,2,6,6-tetramethyl-4-aminopiperidine or 1,2,2,6,6-pentamethyl-4-aminopiperidine.

2.7. Oxalic acid diamides, for example 4,4'-dioctyloxy oxanilide, 2,2'-diethoxy oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl)oxalamide, 2-ethoxy-5-tert-butyl-2'-ethyl oxanilide and a mixture thereof with 2-ethoxy-2'-ethyl-5,4'- di-tert-butyl oxanilide, mixtures of o- and p-methoxy- and also of o- and p-ethoxy-di-substituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy) phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropoxy)-2-hydroxyphenyl]-4,6-bis (2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxalic acid diamide, N-salicylal-N'-salicyloylhydrazine, N,N'-bis (salicyloyl)hydrazine, N,N'-bis(3,5-di-tert-butyl-4-hydroxyphenylpropionyl)-hydrazine, 3-salicyloylamino-1,2,4-triazole, bis(benzylidene)oxalic acid dihydrazide, oxanilide, isophthalic acid dihydrazide, sebacic acid bis-phenylhydrazide, N,N'-diacetyladipic acid dihydrazide, N,N'-bis-salicyloyloxalic acid dihydrazide, N,N'-bis-salicyloylthiopropionic acid dihydrazide.

4. Phosphites and phosphonites, e.g. triphenyl phosphite, diphenylalkyl phosphites, phenyl-dialkyl phosphites, tris (nonylphenyl)phosphite, trilauryl phosphite, trioctadecyl phosphite, distearyl-pentaerythritol diphosphite, tris(2,4-di-tert-butylphenyl)phosphite, diisodecylpenta-erythritol diphosphite, bis(2,4-di-tert-butylphenyl)pentaerythritol diphosphite, bis(2,4-di-cumylphenyl)-pentaerythritol diphosphite, bis(2,6-di-tert-butyl-4-methylphenyl)pentaerythritol diphosphite, bis-isodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl)methylphosphite, bis(2,4-di-tert-butyl-6-methyl-phenyl)ethylphosphite, 6-fluoro-2,4,8,10-tetra-tert-butyl-12-methyl-dibenzo[d,g]-1,3,2-dioxaphosphocine, 2,2', 2"-nitrilo[triethyl-tris(3,3',5,5'-tetra-tert-butyl-1,1'-biphenyl-2,2'-diyl)-phosphite], 2-ethylhexyl-(3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

6. Nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitrone, N-hexadecyl-alpha-heptadecylnitrone, N-octadecyl-alpha-pentadecylnitrone, N-heptadecyl-alpha-hepta-decylnitrone, N-octadecyl-alpha-hexadecylnitrone, nitrones derived from N,N-dialkyl-hydroxylamines prepared from hydrogenated tallow fatty amines.

7. Thiosynergistic compounds, for example thiodipropionic acid dilauryl ester or thiodipropionic acid distearyl ester.

8. Peroxide-destroying compounds, for example esters of β-thio-dipropionic acid, for example the lauryl, stearyl, myristyl or tridecyl ester, mercaptobenzimidazole, the zinc salt of 2-mercaptobenzimidazole, zinc dibutyldithiocarbamate, dioctadecyldisulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

11. Nucleating agents, for example inorganic substances, e.g., metal oxides, such as titanium dioxide or magnesium oxide, phosphates, carbonates or sulfates of preferably alkaline earth metals; organic compounds, such as mono- or polycarboxylic acids and their salts, e.g. 4-tert-butylbenzoic acid, adipic acid, diphenylacetic acid, sodium succinate or sodium benzoate; polymeric compounds, for example ionic copolymerisates ("ionomers"). Special preference is given to 1,3:2, 4-bis(3',4'-dimethylbenzylidene)sorbitol, 1,3:2,4-di(paramethyldibenzylidene)sorbitol and 1,3:2,4-di(benzylidene) sorbitol.

12. Additional fillers and reinforcing agents, for example calcium carbonate, silicates, bentonite, montmorillonite, glass fibres, glass beads, kaolin, mica, barium sulfate, metal oxides and hydroxides, carbon black, graphite, wood powders, and powders and fibres of other natural products, synthetic fibres.

13. Other additives, for example plasticisers, lubricants, emulsifiers, pigments, rheology additives, catalysts, flow improvers, optical brighteners, flame retardants, antistatics, blowing agents.

14. Benzofuranones and indolinones, for example as described in U.S. Pat. No. 4,325,863; U.S. Pat. No. 4,338, 244; U.S. Pat. No. 5,175,312, U.S. Pat. No. 5,216,052; U.S. Pat. No. 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyl-oxyethoxy)phenyl] benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxy-phenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one or 3-(2-acetyl-5-isooctylphenyl)-3-isooctylbenzofuran-2-one.

The costabilizers are added, for example, in concentrations of 0.01 to 10%, relative to the total weight of the synthetic polymer to be stabilized.

Preferred further additives are phenolic antioxidants, light-stabilizers, processing stabilizers, pigments, dyes, plasticizers, compatibilizers, toughening agents and/or impact modifiers.

In addition to the talc [component (b)] other fillers may be used as reinforcing agents (item 12 in the list), for example calcium carbonate, hydrotalcite, mica, kaolin, metal hydroxides, especially aluminium hydroxide or magnesium hydroxide. These are added to the synthetic polymers in concentrations, for example, of from 0.01 to 40%, based on the overall weight of the synthetic polymers. Carbon black as filler can be added to the synthetic polymers in concentrations, judiciously, of from 0.01 to 5%, based on the overall weight of the synthetic polymers.

However, it is preferred that no substantial amount of a non-scaled filler is used. No substantial amount of a non-scaled filler is to be understood as an amount which has no substantial effect on the properties of the synthetic polymer. Such an amount can be, for example, an amount of not more than 0.1%, especially not more than 0.05% by weight, based on the synthetic polymer. More preferably, no nano-scaled filler is used. In addition, it is preferred that the talc filler represents the major filler component, and is present in a range of from 50 to 100%, especially 75 to 100% and more preferably from 90 to 100% by weight, based on the weight of all filler components used. It is highly preferred that the talc represents the only filler component.

Glass fibers as reinforcing agents can be added to the synthetic polymers in concentrations, judiciously, of from 0.01 to 20%, based on the overall weight of the synthetic polymers.

Further preferred compositions comprise in addition to components (a), (b) and (c) further additives as well, especially alkaline earth metal salts of higher fatty acids, for example calcium stearate.

As a conventional stabilizer combination for processing synthetic polymers, for example polyolefins, to form corresponding mouldings, the combination of a phenolic antioxidant with a secondary antioxidant based on an organic phosphite or phosphonite is recommended.

Incorporation of components (b) and (c) and, if desired, further additives into the synthetic polymers is carried out by known methods, for example before or during moulding or else by applying the dissolved or dispersed compounds to the synthetic polymer, if appropriate with subsequent slow evaporation of the solvent.

The present invention also relates to a composite material in the form of a masterbatch or concentrate comprising component (a) in an amount of from 5 to 90%, component (b) in an amount of from 5 to 80%, and component (c) in an amount of from 0.5 to 50% by weight.

Components (b) and (c) and, if desired, further additives, can also be added before or during polymerisation or before crosslinking.

Components (b) and (c), with or without further additives, can be incorporated in pure form or encapsulated in waxes, oils or polymers into the synthetic polymer.

Components (b) and (c), with or without further additives, can also be sprayed onto the synthetic polymer. It is able to dilute other additives (for example the conventional additives indicated above) or their melts so that they too can be sprayed together with these additives onto the polymer. Addition by spraying on during the deactivation of the polymerization catalysts is particularly advantageous, it being possible to carry out spraying using, for example, the steam used for deactivation.

In the case of spherically polymerized polyolefins it may, for example, be advantageous to apply components (b) and (c), with or without other additives, by spraying.

The synthetic polymers prepared in this way can be employed in a wide variety of forms, for example as foams, films, fibres, tapes, moulding compositions, as profiles or as binders for coating materials, especially powder coatings, adhesives, putties or especially as thick-layer polyolefin mouldings which are in long-term contact with extractive media, such as, for example, pipes for liquids or gases, films, fibres, geomembranes, tapes, profiles or tanks.

The preferred thick-layer polyolefin mouldings have a layer thickness of from 1 to 50 mm, in particular from 1 to 30 mm, for example from 2 to 10 mm.

The compositions according to the invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes, sleeves, and conveyor belts.

III-3) Sanitary articles, in particular shower cubicles, lavatory seats, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers (applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon-silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, composites, dolomite, silicates, glass, asbestos).

Thus, a further embodiment of the present invention relates to a shaped article, in particular a film, pipe, profile, bottle, tank or container, fiber containing a composition as described above.

A further embodiment of the present invention relates to a molded article containing a composition as described above. The molding is in particular effected by injection, blow, compression, roto-molding or slush-molding or extrusion.

The compositions according to the present invention are preferably composite polymers which are in the cured state.

The present invention also relates to a process for the preparation of a synthetic polymer material, especially a composite material, which comprises melt mixing a mixture of
(a) a synthetic polymer,
(b) a talc as a filler, wherein the talc particles have a mean particle size of from 0.4 to 25 µm and
(c) a dispersing agent which is based on a non-ionic surfactant or a statistical, block or comb copolymer.

The melt mixing can be carried out in any heatable container equipped with a stirrer, for example in a closed apparatus such as a kneader, mixer or stirred vessel. The incorporation is preferably carried out in an extruder or in a kneader. It is immaterial whether processing takes place in an inert atmosphere or in the presence of oxygen.

The addition of components (a), (b) and (c) can be carried out in all customary mixing machines in which the polymer is melted and mixed with the additives. Suitable machines are known to those skilled in the art. They are predominantly mixers, kneaders and extruders. The process is preferably carried out in an extruder by introducing the additive during processing. Particularly preferred processing machines are single-screw extruders, contrarotating and corotating twin-screw extruders, planetary-gear extruders, ring extruders or cokneaders. It is also possible to use processing machines provided with at least one gas removal compartment to which a vacuum can be applied. Suitable extruders and kneaders are described, for example, in Handbuch der Kunststoffextrusion, Vol. 1, Grundlagen, Editors F. Hensen, W. Knappe, H. Potente, 1989, pp. 3-7, ISBN:3-446-14339-4; and Vol. 2

Extrusions-anlagen 1986, ISBN 3-446-14329-7. For example, the screw length is 1-60 screw diameters, preferably 35-48 screw diameters. The rotational speed of the screw is preferably 10 to 600 rotations per minute (rpm), for example 25-300 rpm. The maximum throughput is dependent on the screw diameter, the rotational speed and the driving force. The process of the present invention can also be carried out at a level lower than maximum throughput by varying the parameters mentioned or employing weighing machines delivering dosage amounts. If a plurality of components are added, these can be premixed or added individually.

Also of interest is a process for the preparation of a synthetic polymer material, wherein the melt mixing of the components (synthetic polymer, talc as a filler, and the dispersing agent) occurs between 120 and 290° C., preferably between 150 and 290° C., for example between 170 and 230° C.

The present invention also relates to synthetic polymer composites obtained by the above mentioned process.

The preferred components (b) and (c), and optionally further additives, in the process for the preparation of a synthetic polymer material are the same as those described for the composition.

A preferred embodiment of the present invention is also the use of the dispersing agent [component (c)] to disperse the talc filler [component (b)] in a synthetic polymer matrix to form a composite material.

The preferred dispersing agent, talc and synthetic polymer, and optionally further additives, for this use are the same as those described for the composition.

The following examples illustrate the invention further. Parts or percentages relate to weight.

EXAMPLES 1 TO 26

In a first step, a 10 weight-% clay masterbatch, consisting of Moplen®HF 500N (polypropylene; Basell Polyolefins, Germany), 0.25 weight-% of Irganox B225® [1:1 mixture of Irganox 1010® (pentaerythritol ester of 3-(3,5-di-tert-butyl-4-hydroxyphenyl)propionic acid) and Irgafos 168® (tris(2,4-di-tert-butylphenyl)phosphite)], 10% Finntalc M05N, or Finntalc M03, or Finntalc M05SL [® Mondo Minerals OY] and the dispersing agent in the amount defined in Table 1b), is prepared on a Werner&Pfleiderer twin-screw extruder (ZSK25) at a temperature of at most 200° C. (Table 1b), Examples 7 to 13).

For comparison a nanocomposite based on 10% Cloisite Na+ [® obtained from Southern Clay Industries] instead of Finntalc is prepared under the same conditions (Table 1a), Examples 2 to 6).

For further comparison a composition comprising no filler and no dispersing agent is shown in Example 1 of Table 1a).

TABLE 1a

| [Examples 1 to 6] | | | | | | |
|---|---|---|---|---|---|---|
| | Ex. 1 | Ex. 2 | Ex. 3 | Ex. 4 | Ex. 5 | Ex. 6 |
| Moplen HF 500N | 100 | 89 | 89 | 88 | 88 | 88 |
| Irganox B225 | 0.25 | 0.25 | 0.25 | 0.25 | 0.25 | 0.25 |
| Cloisite Na | | 10 | 10 | 10 | 10 | 10 |
| Tegomer DA100[d] | | 1 | | | | |
| PE-b-PEO (MW 575)[e] | | | 1 | 2 | | |
| Sorbitan Tetrastearate[f] | | | | | 2 | |
| P(ODA-co-MAH)[g] | | | | | | 2 |

TABLE 1b

| [Examples 7 to 13] | | | | | | | |
|---|---|---|---|---|---|---|---|
| | Ex. 7 | Ex. 8 | Ex. 9 | Ex. 10 | Ex. 11 | Ex. 12 | Ex. 13 |
| Moplen HF 500N | 88 | 88 | 88 | 89 | 89 | 89 | 89 |
| Irganox B225 | 0.25 | 0.25 | 0.25 | 0.25 | 0.25 | 0.25 | 0.25 |
| Finntalc M05N[a] | 10 | 10 | 10 | | | | |
| Finntalc M03[b] | | | | 10 | 10 | | |
| Finntalc M05SL[c] | | | | | | 10 | 10 |
| Tegomer DA100[d] | | | 0.5 | | 0.5 | | |
| PE-b-PEO (MW 575)[e] | 2 | | | | 0.5 | | 0.5 |
| Sorbitan Tetrastearate[f] | | 2 | | | | | |
| P(ODA-co-MAH)[g] | | | 2 | | | | |

Definition of components given in Tables 1a) and 1b):

a) Finntalc M05N: Talc (Mg Silicate), Top cut (D98%) 15 μm b) Finntalc M03: Talc (Mg Silicate), Top cut (D98%) 15 μm c) Finntalc M05SL: Talc (Mg Silicate), Top cut (D98%) 10 μm d) Tegomer DA 100®: 1:1 ratio methyl methacrylate:ODMA e) PE-b-PEO (MW 575)® is a linear polyethylene-block-poly(ethylene oxide)

f) Sorbitan Tetrastearate is a compound of the formula I

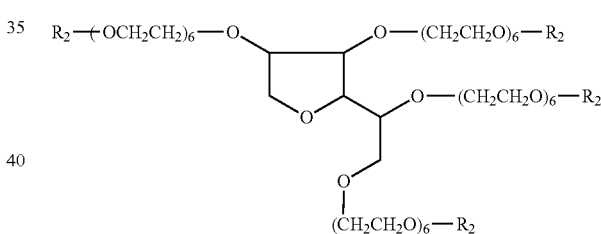

wherein $R_2$ is $C_{18}$alkanoyl.

g) P(ODA-co-MAH): Poly(octadecyl acrylate-co-maleic anhydride) (Molecular ratio 3:1) synthesized via RAFT.

In the second step the masterbatches of Examples 1 to 13 are each let down to the required clay level (5 weight-%) by blending the corresponding masterbatch (Feed 2) with further Moplen®HF 500N plus stabilizer (Feed 1). The first barrel section is heated at 180° C. the remaining barrel sections are heated at 200° C. The amount of stabilizer (Irganox 8225) is chosen to reach an amount of stabilizer in the final composition of 0.25 weight-% (the final compositions are given in Table 2).

Injection moulding of the extruded samples is preformed with an Arburg 270 S at a temperature of 230° C.

Tensile testing is performed according to ASTM D 638 with a Zwick universal material tensile machine.

Tensile impact strength is carried out according to DIN 53448.

The Vicat temperature is performed according to ISO 306: 1987(E).

The results are summarized in Table 2.

TABLE 2

| Example | | Tensile modulus | Tensile impact strength. | Tensile strength [MPa] | Vicat temperature |
|---|---|---|---|---|---|
| 14[a] | Composition of Example 1 | 1.00 | 1.00 | 35 | 1.00 |
| 15[a] | 50% of composition of Example 2 + 50% stabilized Moplen HF 500N | 1.15 | 0.46 | 37 | 1.04 |
| 16[a] | 50% of composition of Example 3 + 50% stabilized Moplen HF 500N | 1.16 | 0.52 | 37 | 1.03 |
| 17[a] | 50% of composition of Example 4 + 50% stabilized Moplen HF 500N | 1.15 | 0.53 | 36 | 1.05 |
| 18[a] | 50% of composition of Example 5 + 50% stabilized Moplen HF 500N | 1.13 | 0.68 | 35 | 1.02 |
| 19[a] | 50% of composition of Example 6 + 50% stabilized Moplen HF 500N | 1.18 | 0.66 | 36 | 1.03 |
| 20[b] | 50% of composition of Example 7 + 50% stabilized Moplen HF 500N | 1.39 | 1.04 | 39 | 1.08 |
| 21[b] | 50% of composition of Example 8 + 50% stabilized Moplen HF 500N | 1.40 | 1.03 | 39 | 1.09 |
| 22[b] | 50% of composition of Example 9 + 50% stabilized Moplen HF 500N | 1.38 | 0.84 | 39 | 1.07 |
| 23[b] | 50% of composition of Example 10 + 50% stabilized Moplen HF 500N | 1.36 | 0.98 | 38 | 1.11 |
| 24[b] | 50% of composition of Example 11 + 50% stabilized Moplen HF 500N | 1.36 | 1.06 | 38 | 1.12 |
| 25[b] | 50% of composition of Example 12 + 50% stabilized Moplen HF 500N | 1.31 | 1.07 | 38 | 1.12 |
| 26[b] | 50% of composition of Example 13 + 50% stabilized Moplen HF 500N | 1.33 | 0.98 | 39 | 1.12 |

[a] Comparative Examples
[b] Examples according to the invention

In Table 2, the value of the tensile modulus [MPa], the tensile impact strength [kj/m$^2$] and the Vicat temperature [° C.] are relative values related to 100% (stabilized) Moplen HF 500N.

From Table 2 it can be seen that all Examples according to the present invention (Examples 20 to 26) show an improved tensile modulus, tensile strength and Vicat temperature compared to pure polypropylene (Example 14) and the comparative Examples 15 to 19.

EXAMPLES 27 TO 41

Processing is carried out with a Japan Steel Works 30 mm diameter twin screw extruder of L/D ratio 42 (JSW TEX 30) that comprises ten temperature controlled barrel sections each with L/D of 3.5, three unheated sampling zones with L/D 1.167, and a cooled feed block with L/D 3.5. The screw configuration consists of a combination of mixing, kneading and conveying elements familiar to those skilled in the art. Materials are fed into the extruder via a JSW TTF20 gravimetric feeder (Feed 1) and a K-Tron KQX gravimetric feeder (Feed 2). The JSW TEX 30 is operated in a co rotating (intermeshing self wiping) mode. Vacuum venting is applied to the final barrel section. The extrudate is cooled in a water filled strand bath and pelletized.

In a first step, a 50 weight-% clay masterbatch consisting of Austrex 103 (polystyrene; Hunstsman, Australia), Finntalc M05SL® Mondo Minerals OY] and the dispersing agent in the amount defined in Table 3), is prepared on a Japan Steel Works TEX 30 at a temperature of at most 200° C. and a feed rate of 2 Kg/h.

TABLE 3

| | Ex. 27 | Ex. 28 | Ex. 29 | Ex. 30 | Ex. 31 | Ex. 32 | Ex. 33 |
|---|---|---|---|---|---|---|---|
| Austrex 103 | 100 | 40 | 40 | 40 | 40 | 40 | 40 |
| Cloisite Na | 0 | 50 | 50 | | | | |
| Cloisite 20A[)] | | | | 50 | 50 | | |
| Finntalc M05SL[c)] | | | | | | 50 | 50 |
| P(Styrene-co-AA)[g)] | | | 10 | | 10 | | 10 |

In the second step the masterbatches of Examples 27 to 33 are each let down to the required clay level (5 weight-%) by blending the corresponding masterbatch (Feed 2) with further Austrex 103 (Feed 1) using the JSW extruder with a fee rate of 5 kg/h. The first barrel section is heated at 160° C. the remaining barrel sections are heated at 200° C. (the final compositions are given in Table 2).

Injection moulding of the extruded samples are preformed with a Cincinnati Milacron VS55 28 mm diameter injection moulding machine comprising four temperature controlled sections of L/D23/1. The machine is operated at a clamp force of 50 tons and at a maximum injection pressure of 2005 bar.

Tensile testing is performed according to ISO 521 using an Instron 5500R material tensile tester.

The results are summarized in Table 4.

TABLE 4

| Example | | Tensile modulus | Elongation at Break | Tensile strength] |
|---|---|---|---|---|
| Control | Austex 103 | 1.00 | 1.00 | 1.00 |
| 34[a] | 10% Composition of Example 27 + 90% of Austrex 103 | 1.01 | 1.00 | 0.97 |
| 35[a] | 10% Composition of Example 28 + 90% of Austrex 103 | 1.06 | 0.46 | 0.99 |
| 36[a] | 10% Composition of Example 29 + 90% of Austrex 103 | 1.10 | 1.09 | 0.97 |
| 37[a] | 10% Composition of Example 30 + 90% of Austrex 103 | 1.16 | 0.86 | 0.89 |
| 38[a] | 10% Composition of Example 31 + 90% of Austrex 103 | 1.17 | 0.51 | 0.90 |
| 39[a] | 10% Composition of Example 32 + 90% of Austrex 103 | 1.21 | 0.65 | 0.97 |
| 40[b] | 10% Composition of Example 33 + 90% of Austrex 103 | 1.20 | 0.63 | 1.01 |

TABLE 4-continued

| Example | | Tensile modulus | Elongation at Break | Tensile strength] |
|---|---|---|---|---|
| 41[b] | 2% Composition of Example 33 + 98% of Austrex 103 | 1.07 | 1.05 | 0.99 |

[a])Comparative Examples
[b])Examples according to the invention

In Table 2, the value of the tensile modulus [MPa], the elongation at break and the tensile strength are relative values related to 100% Austex 103.

EXAMPLES 42 TO 68

Processing is carried out with a Japan Steel Works 30 mm diameter twin screw extruder of L/D ratio 42 (JSW TEX 30) that comprised ten temperature controlled barrel sections each with L/D of 3.5, three unheated sampling zones with L/D 1.167, and a cooled feed block with L/D 3.5. The screw configuration consisted of a combination of mixing, kneading and conveying elements familiar to those skilled in the art. Materials were fed into the extruder via a JSW TTF20 gravimetric feeder (Feed 1) and a K-Tron KQX gravimetric feeder (Feed 2). The JSW TEX 30 is operated in a co rotating (intermeshing self wiping) mode. Vacuum venting is applied to the final barrel section. The extrudate was cooled in a water filled strand bath and pelletized.

In a first step, a 10 weight-% clay masterbatch consisting of HP400N (Polypropylene; Basell, Australia), the clay and the dispersing agent of the grade and amount defined in Table 5), was prepared on a Japan Steel Works TEX 30 at a temperature of 170° C. and a feed rate of 10 Kg/h. The polypropylene and stabilizer was added as Feed 1. The dispersing agent was manually mixed with the talc to give a homogeneous powder which was dried at 80° C. and added as Feed 2.

TABLE 5

| | Example No. | | | | | | | | | | | | |
|---|---|---|---|---|---|---|---|---|---|---|---|---|---|
| | 42 | 43 | 44 | 45 | 46 | 47 | 48 | 49 | 50 | 51 | 52 | 53 | 54 |
| PP HP400N | 100 | 88 | 90 | 88 | 88 | 88 | 90 | 88 | 88 | 88 | 90 | 88 | 88 |
| Cloisite Na+ | | 10 | | | | | | | | | | | |
| Finntalc M05SL | | | 10 | 10 | 10 | 10 | | | | | | | |
| Finntalc M05N | | | | | | | 10 | 10 | 10 | 10 | | | |
| Finntalc M03 | | | | | | | | | | | 10 | 10 | 10 |
| P(ODA-co-NVP)[a] | | 2 | | 2 | | | | 2 | | | | 2 | |
| P(ODA-co-NVP)[b] | | | | | 2 | | | | | | | | |
| Tegomer DA100N[c] | | | | | | 2 | | | 2 | | | | 2 |
| PE-b-PEO 575[d] | | | | | | | | | | 2 | | | |
| Irgostab B225 | 0.2 | 0.2 | 0.2 | 0.2 | 0.2 | 0.2 | 0.2 | 0.2 | 0.2 | 0.2 | 0.2 | 0.2 | 0.2 |

[a])Poly(octadecyl acrylate-co-N-vinyl pyrrolidone) ratio 4:1 prepared as described in Moad et al WO2004113436
[b])Poly(octadecyl acrylate-co-N-vinyl pyrrolidone) ratio 3:1 prepared as described in Moad et al WO2004113436
[c])Tegomer DA100N is a poly(octadecyl methacrylate-co-methyl methacylate) supplied by Goldschmidt
[d])PE-b-PEO (MW 575) is a linear polyethylene-block-poly(ethylene oxide) supplied by Aldrich Chemical Co In the second step the masterbatches of Examples 42 to 52 were each let down to the required clay level (5 weight-%) by blending the corresponding masterbatch (Feed 2) with further HP400N+further stabilizer (Feed 1) using the JSW extruder with a fee rate of 10 kg/h. The first barrel section is heated at 160° C. the remaining barrel sections are heated at 200° C. The final compositions are given in Table 6.

Injection moulding of the extruded samples was preformed with a Cincinnati Milacron VS55 28 mm diameter injection moulding machine comprising four temperature controlled sections (at 230° C.) of L/D23/1. The machine was operated at a clamp force of 50 tons and at a maximum injection pressure of 2005 bar. The mould temperature was 40° C.

Tensile testing is performed according to ISO 521 using an Instron 5500R material tensile tester.

Distortion temperature under load (DTUL) was determined by dynamic mechanical temperature analysis according to ASTM method E2092-04.

The results are summarized in Table 6.

dispersing agent of the grade and amount defined in Table 7 was prepared on a Brabender Plasticorder PL2000 twin screw extruder. The clay was preblended with the additive at 80° C. and dried at 60° C. All components were then mixed and added to directly to the hopper. The four temperature zones of the Brabender were set at 160, 200, 220, and 230° C.

TABLE 6

| Example | | Tensile strength | Tensile modulus | Elongation at Break | DTUL ° C. |
|---|---|---|---|---|---|
| Control | HP400N | 1.0 | 1.0 | — | 72 |
| 55[a] | 50% Composition of Example 42 + 50% of HP400N | 1.04 | 1.06 | — | |
| 56[a] | 50% Composition of Example 43 + 50% of HP400N | 1.05 | 1.20 | 1.0 | 78 |
| 57[a] | 50% Composition of Example 44 + 50% of HP400N | 1.16 | 1.48 | 1.48 | 92 |
| 58[b] | 50% Composition of Example 45 + 50% of HP400N | 1.10 | 1.38 | 1.38 | 91 |
| 59[b] | 50% Composition of Example 46 + 50% of HP400N | 1.12 | 1.36 | 1.36 | |
| 60[b] | 50% Composition of Example 46 + 50% of HP400N[d] | 1.12 | 1.37 | 2.62 | |
| 61[b] | 50% Composition of Example 47 + 50% of HP400N | 1.12 | 1.34 | 1.34 | 87 |
| 62[a] | 50% Composition of Example 48 + 50% of HP400N | 1.16 | 1.46 | 1.36 | |
| 63[b] | 50% Composition of Example 49 + 50% of HP400N | 1.12 | 1.41 | 1.50 | |
| 64[b] | 50% Composition of Example 50 + 50% of HP400N | 1.09 | 1.31 | 1.15 | |
| 65[b] | 50% Composition of Example 51 + 50% of HP400N | 1.15 | 1.47 | 0.97 | |
| 66[a] | 50% Composition of Example 52 + 50% of HP400N | 1.16 | 1.49 | 1.00 | |
| 67[b] | 50% Composition of Example 53 + 50% of HP400N | 1.11 | 1.43 | 1.14 | |
| 68[b] | 50% Composition of Example 54 + 50% of HP400N | 1.10 | 1.40 | 1.70 | |

[a]Comparative Examples
[b]Examples according to the invention
[c]Processed at 250° C. with throughput of 20 kg/h From Table 6 it can be seen that Examples according to the present invention show an improved tensile modulus, tensile strength and heat distortion temperature under load compared to polypropylene (Example 68) and improved elongation at break and heat distortion temperature under load compared to samples based on nanoclay (Example 56). Elongation at break is improved by addition of the additive yet tensile modulusm and tensile strength remain substantially better than polypropylene. Example 60 shows that use of a higher processing temperature and throughput causes no degradation of properties.

EXAMPLES 53 TO 64

In a first step, a 50 weight-% clay masterbatch consisting of HP400N (Polypropylene; Basell, Australia), the clay and the

TABLE 5

| | Example No. | | | |
|---|---|---|---|---|
| | 53 | 54 | 55 | 56 |
| PP HP400N | 50 | 40 | 45 | 48 |
| Finntalc M05SL | 50 | 50 | 50 | 50 |
| P(ODA-co-NVP)[b] | | 10 | 5 | 2 |
| Irgostab B225 | 0.2 | 0.2 | 0.2 | 0.2 |

In the second step the masterbatches of Examples 53 to 56 were each let down to the required clay level by blending the corresponding masterbatch (Feed 2) with further HP400N+ further stabilizer (Feed 1) using the JSW extruder with a fee rate of 10 kg/h. The first barrel section is heated at 160° C. the remaining barrel sections are heated at 200° C. The final compositions are given in Table 8.

Injection moulding of the extruded samples was preformed with a Cincinnati Milacron VS55 28 mm diameter injection moulding machine comprising four temperature controlled sections (at 230° C.) of L/D23/1. The machine was operated at a clamp force of 50 tons and at a maximum injection pressure of 2005 bar. The mould temperature was 40° C.

Tensile testing is performed according to ISO 521 using an Instron 5500R material tensile tester.

Distortion temperature under load (DTUL) was determined by dynamic mechanical temperature analysis according to ASTM method E2092-04.

The results are summarized in Table 8.

TABLE 8

| Example | | Tensile strength | Tensile modulus | Elongation at Break | DTUL ° C. |
|---|---|---|---|---|---|
| Control | HP400N | 1.0 | 1.0 | — | 72 |
| 57[a)] | 100% of HP400N | 1.06 | 1.09 | — | |
| 58[a)] | 10% Composition of Example 53 + 90% of HP400N | 1.17 | 1.55 | 2.96 | 97 |
| 59[b)] | 20% Composition of Example 54 + 80% of HP400N | 1.08 | 1.35 | 2.90 | |
| 60[b)] | 10% Composition of Example 54 + 90% of HP400N | 1.12 | 1.48 | 4.07 | 93 |
| 61[b)] | 6% Composition of Example 54 + 94% of HP400N | 1.13 | 1.40 | 7.67 | |
| 62[b)] | 2% Composition of Example 54 + 98% of HP400N | 1.13 | 1.34 | 6.05 | |
| 63[b)] | 10% Composition of Example 55 + 90% of HP400N | 1.04 | 1.40 | 5.16 | |
| 64[b)] | 10% Composition of Example 56 + 90% of HP400N | 1.04 | 1.48 | 3.53 | |

From Table 6 it can be seen that Examples can be successfully prepared from a high clay materbatch. Examples according to the present invention show an improved tensile modulus, tensile strength and heat distortion temperature under load compared to polypropylene (Example 57) and improved elongation at break and heat distortion temperature under load compared to samples based on nanoclay (Example 56). Elongation at break is improved by addition of the additive yet tensile modulus and tensile strength remain substantially better than polypropylene.

What is claimed is:

1. A composition comprising
   (a) a synthetic polymer,
   (b) a talc as a filler, wherein the talc particles have a mean particle size of from 0.4 to 25 µm and are present in an amount of from 0.1 to 10% based on the weight of component (a) and
   (c) a dispersing agent which is an amphiphilic statistical, block or comb copolymer comprising a $C_{12}$-$C_{32}$alkyl (meth)acrylate;
   provided that when the synthetic polymer (a) is a polyamide, this is present in an amount of less than 55% based on the weight of (a), (b) and (c).

2. A composition according to claim 1, wherein component (b) is present in an amount of from 1 to 10% based on the weight of component (a).

3. A composition according to claim 1, wherein component (a) is a polyolefin.

4. A composition according to claim 1, wherein component (a) is polyethylene or polypropylene or copolymers thereof, or mixtures thereof.

5. A composition according to claim 1, wherein component (b) is present in an amount of from 2.5 to 7.5%, based on the weight of component (a).

6. A composition according to claim 1, wherein component (b) has a mean particle size of from 0.4 to 10 µm.

7. A composition according to claim 1, wherein component (c) is present in an amount of from 0.01 to 10%, based on the weight of component (a).

8. A composition according to claim 1, comprising in addition to components (a), (b) and (c), further additives.

9. A composition according to claim 8, where the further additives are phenolic antioxidants, light-stabilizers, processing stabilizers, pigments, dyes, plasticizers, compatibilizers, toughening agents or impact modifiers.

10. A composition according to claim 1 in the form of a masterbatch or concentrate comprising component (a) in an amount of from 5 to 90%, component (b) in an amount of from 5 to 80%, and component (c) in an amount of from 0.5 to 50% by weight.

11. A process for the preparation of a synthetic polymer material which comprises melt mixing a mixture of
   (a) a synthetic polymer,
   (b) a talc as a filler, wherein the talc particles have a mean particle size of from 0.4 to 25 µm and are present in an amount of from 0.1 to 10% based on the weight of component (a) and
   (c) a dispersing agent which is an amphiphilic statistical, block or comb copolymer comprising a $C_{12}$-$C_{32}$alkyl (meth)acrylate;
   provided that when the synthetic polymer (a) is a polyamide, this is present in an amount of less than 55% based on the weight of (a), (b) and (c).

12. A process according to claim 11, wherein component (b) is present in an amount of from 1 to 10% based on the weight of component (a).

13. A process according to claim 11, wherein the melt mixing occurs between 150 and 290° C.

14. A synthetic polymer composite obtained by the process according to claim 11.

* * * * *